(12) United States Patent
Bae

(10) Patent No.: US 6,337,723 B1
(45) Date of Patent: Jan. 8, 2002

(54) METHOD FOR MANUFACTURING A TFT-LCD USING CF AND H ETCHING GAS FOR ETCHING ORGANIC INSULATOR

(75) Inventor: Sung Sik Bae, Kyoungki-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/247,455

(22) Filed: Feb. 10, 1999

(30) Foreign Application Priority Data

Sep. 1, 1998 (KR) .......................... P98-35927

(51) Int. Cl.[7] .................. G02F 1/136; G02F 1/15; G02F 1/1343; H01L 4/00
(52) U.S. Cl. .................. 349/43; 349/187; 349/138; 438/149
(58) Field of Search .................. 349/42, 187, 138, 349/43; 438/149, 301; 257/59, 72

(56) References Cited

U.S. PATENT DOCUMENTS

| 5,229,645 A | * | 7/1993 | Nakashima .................. 257/773 |
| 5,668,380 A | * | 9/1997 | Wuu et al. .................. 257/66 |
| 5,978,058 A | * | 11/1999 | Sung .......................... 349/139 |
| 6,037,195 A | * | 3/2000 | Toriyama et al. ........... 438/149 |

* cited by examiner

Primary Examiner—Toan Ton
(74) Attorney, Agent, or Firm—Birch, Stewart, Kolasch & Birch, LLP

(57) ABSTRACT

A method of manufacturing an LCD in which a pixel electrode is formed on a photosensitive passivation layer uses an etching gas including at least one of $CF_4+H_2$, $C_xF_y+H_2$, $C_xF_y+C_xF_yH_z$, $C_xF_y+C_xF_yH_z+H_2$ and $C_xF_yH_z$. As a result, a surface of the patterned passivation layer is easily and reliably made to be even. Furthermore, the gate insulating layer is simultaneously patterned to form a gate contact hole without experiencing any over-etching and/or undercut portions.

20 Claims, 3 Drawing Sheets

METHOD FOR MANUFACTURING A TFT-LCD USING CF AND H ETCHING GAS FOR ETCHING ORGANIC INSULATOR

BACKGROUND OF THE INVENTION

1. Field of the Invention

The present invention relates to a method of manufacturing a liquid crystal display device (LCD) and more particularly, the present invention relates to a method of manufacturing an LCD in which a pixel electrode is formed on a photosensitive passivation layer.

2. Description of the Background Art

Generally, a conventional liquid crystal display device in which a pixel electrode is formed on a photosensitive passivation layer includes a gate bus line 60 and a data bus line 70 which are arranged in a matrix array, as shown in FIG. 1. At the end portions of the gate bus line 60 and the data bus line 70, a gate pad 60c and a data pad 70c connected to an output of a driving IC are formed, respectively. The LCD further includes a TFT which functions as a switching element and is driven by an electrical signal from the gate bus line 60 and the data bus line 70. The TFT is disposed at the intersection portion of the gate bus line and data bus line. The LCD also includes a pixel electrode 40 connected to the TFT.

The TFT includes a gate electrode 60a derived from the gate bus line 60, a source electrode 70a derived from the data bus line 70 and a drain electrode 70b arranged to face the source electrode 70a. The gate electrode 60a is covered by a gate insulating layer (not shown). A semiconductor layer 90 is disposed over the gate electrode 60a on the gate insulating layer. The source electrode 70a and the drain electrode 70b are disposed at each side of the semiconductor layer 90. The drain electrode 70b is connected to the pixel electrode 40 through a contact hole 30a formed at a passivation layer (not shown). At the overlapped portion of the adjacent gate bus line 70, a storage capacitance electrode 35 is connected to the pixel electrode 40 through a storage contact hole 30b.

Referring to FIG. 2 which is a cross-sectional view of FIG. 1 cut along line A—A in FIG. 1, the structure and method of manufacturing of the LCD in which a pixel electrode is formed on the photosensitive passivation layer will be explained in detail.

On a transparent substrate 10, a gate bus line 60, a gate electrode 60a derived from the gate bus line 60 and a gate pad 60b disposed at the end of the gate bus line 60 are formed. A gate insulating layer 50 including $SiN_x$ or $SiO_x$ is formed so as to cover the entire surface of the substrate including the gate bus line 60, the gate electrode 60a and the gate pad 60b. An island-shaped semiconductor layer 90 including a-Si (amorphous silicon) is formed on the gate insulating layer 50 over the gate electrode 60a. Ohmic contact layers 90a and 90b including $n^+$ type a-Si are formed separately on the semiconductor layer 90. A source electrode 70a and a drain electrode 70b are connected to the ohmic contact layers 90a and 90b, respectively. A data bus line 70 connected to the source electrode 70a is formed on the gate insulating layer 50. A TFT is completed by forming the gate electrode 60a, the semiconductor layer 90, the ohmic contact layers 90a and 90b, the source electrode 70a and the drain electrode 70b.

A passivation layer 80 including a photosensitive acrylic resin is formed on the entire surface of the substrate having the TFT. A drain contact hole 30a, a storage contact hole 30b (FIG. 1) and a gate pad contact hole 30c are formed by patterning the passivation layer 80. The method of forming the contact holes includes the steps of exposing the photosensitive passivation layer with a mask, developing the passivation layer with a developer and removing the remaining passivation layer material at the contact holes with an etchant which is $CF_4+O_2$ or $SF_6+O_2$ gas. At the same time, some portions of the gate insulating layer 50 covering the gate pad 60b are removed to form a gate pad contact hole 30c exposing the gate pad 60b by using the $CF_4+O_2$ or $SF_6+O_2$ gas.

After the contact holes are formed, a pixel electrode 40 and a gate pad terminal 40a are formed by depositing an ITO (Indium Tin Oxide) on the entire surface of the substrate and then patterning the ITO layer.

The reason for using the photosensitive material for the passivation layer is that the manufacturing process is simplified because a photo resist is not used and the contact hole can be formed by etching the passivation layer directly.

In above mentioned conventional method, the surface of the passivation layer is not smooth and uniform because it is attacked by the $CF_4+O_2$ or $SF_6+O_2$ etching gas. As a result of the etching gas attacking the passivation layer surface, the pixel electrode formed on the uneven surface of the passivation layer has an undesired, uneven shape. Furthermore, when the remaining passivation layer and the gate insulating layer are removed to form a gate contact hole with the $CF_4+O_2$ or $SF_6+O_2$ etching gas, the drain electrode can be cut off as shown in region F of FIG. 2, or the gate pad and the gate insulating layer can be over-etched as shown in region G of FIG. 2.

According to the conventional method, the metal layer disposed under the passivation layer can be cut off or over-etched by the $CF_4+O_2$ or $SF_6+O_2$ etching gas, when the passivation layer is patterned so that the quality of the LCD becomes inferior.

SUMMARY OF THE INVENTION

In order to overcome the problems in the conventional methods described above, preferred embodiments of the present invention provide a method of manufacturing an LCD in which a passivation layer including a photosensitive acrylic resin has a smooth, even surface after the passivation layer is patterned and a metal layer under a passivation layer including a photosensitive acrylic resin is not cut off. In addition, preferred embodiments of the present invention provide a method of manufacturing an LCD in which a gate pad and a gate insulating layer are not over-etched when the gate insulating layer is patterned to form a gate contact hole.

To solve the above-described problems with the conventional methods and to achieve the results described in the preceding paragraph, preferred embodiments of the present invention provide a method of manufacturing an LCD using an etching gas including one of $CF_4+H_2$, $C_xF_y+H_2$, $C_xF_y+C_xF_yH_z$, $C_xF_y+C_xF_yH_z+H_2$ and $C_xF_yH_z$. The method according to preferred embodiments of the present invention includes the steps of forming on a substrate, a switching element, bus lines connected to the switching element and pads at the end of each of the bus lines, coating a photosensitive passivation layer on an entire surface of the substrate, forming contact holes exposing an electrode and a pad by exposing and developing the passivation layer such that a portion of the passivation remains, removing a remaining portion of the passivation layer at the contact hole using an etching gas including at least one of $CF_4+H_2$, $C_xF_y+H_2$, $C_xF_y+C_xF_yH_z$, $C_xF_y+C_xF_yH_z+H_2$ and $C_xF_yH_z$ and forming a pixel electrode connected to the exposed electrode through the contact hole.

Other advantages, features and novel elements of preferred embodiments of the present invention will become apparent from the following description of preferred embodiments of the present invention with reference to the drawing figures attached hereto.

BRIEF DESCRIPTION OF THE ATTACHED DRAWINGS

The present invention will become more fully understood by the detailed description of preferred embodiments of the present invention provided below and the accompanying drawings which are provided as a way of illustration only and thus are not limitative of the present invention, and wherein.

DETAILED DESCRIPTION OF PREFERRED EMBODIMENTS

Referring to FIGS. 3a–3e, a preferred embodiment of the present invention will be explained in detail. FIGS. 3a–3e are cross-sectional views showing a method for manufacturing an LCD panel according to the present invention.

Figure 1:
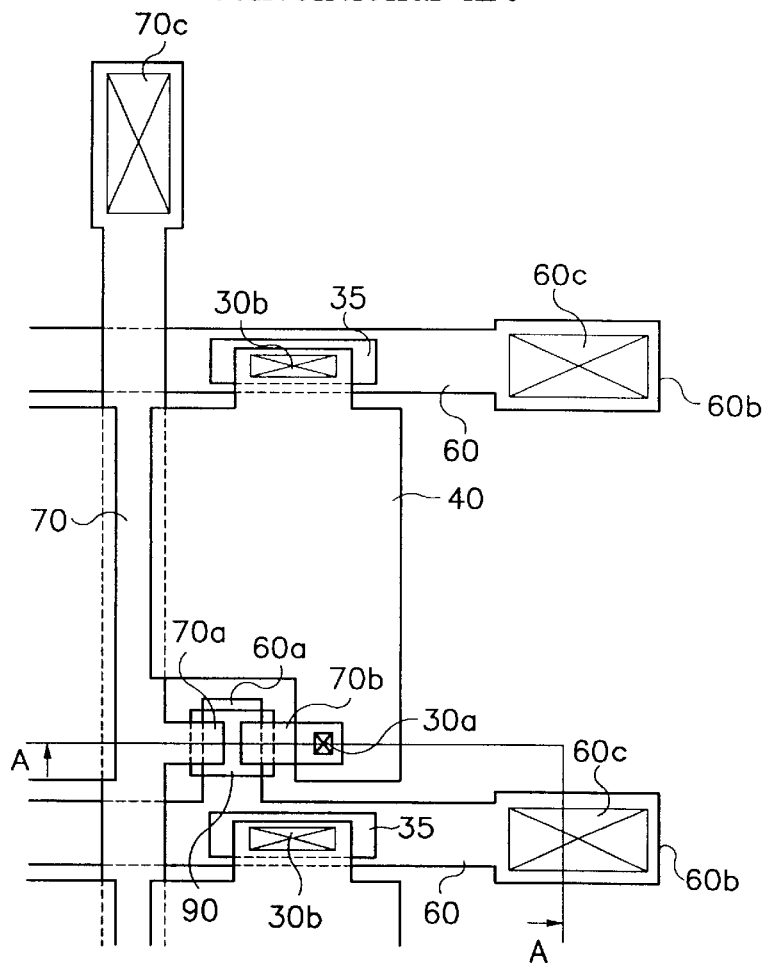
FIG. 1 is a plan view of the conventional liquid crystal display device.
Figure 2:
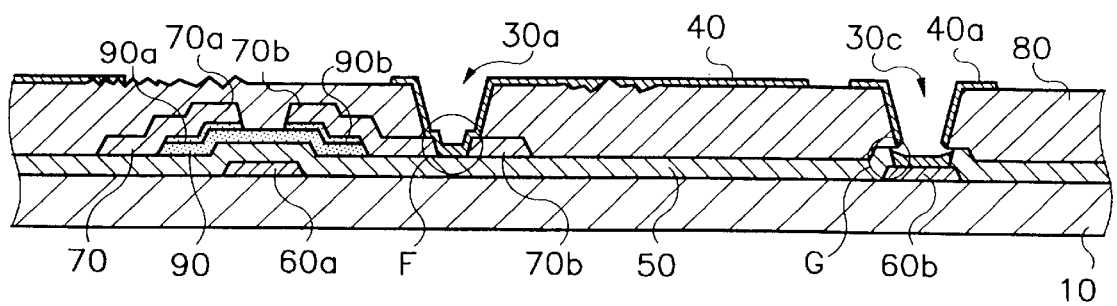
FIG. 2 is a cross-sectional view which is cut along line A—A of FIG. 1 and illustrates the conventional manufacturing process of the LCD.
Figure 3A:
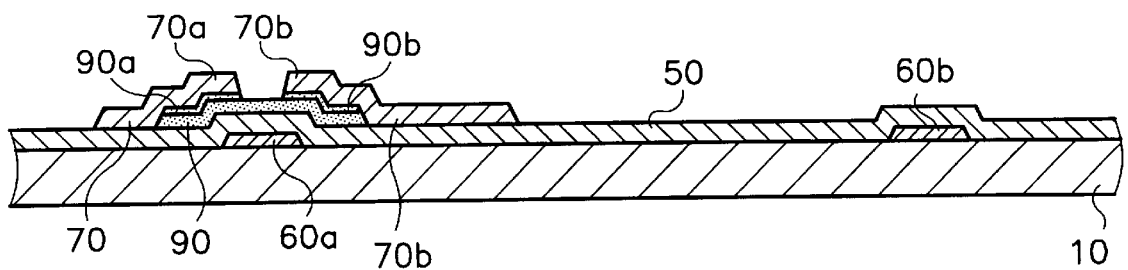
FIGS. 3a–3e are cross-sectional views illustrating a manufacturing process for a liquid crystal display according to a preferred embodiment of the present invention.

A gate electrode 60a is formed preferably using a metal such as aluminum (Al), chromium (Cr), molybdenum (Mo) or molybdenum-tungsten (MoW) alloy on a transparent substrate 10. A gate insulating layer 50 is formed on the gate electrode 60a using an inorganic material such as a SiNx or SiOx or an organic material such as a BCB (benzoCycloButene). An island-shaped semiconductor layer 90 is formed on the gate insulating layer 50 over the gate electrode 60a using an amorphous silicon (a-Si). Ohmic contact layers 90a and 90b are formed on the two sides of the semiconductor layer 90. A source electrode 70a connected to one ohmic contact layer 90a and a drain electrode 70b connected to the other ohmic contact layer 90b are formed by using aluminum or chromium. Therefore, a TFT is completed and adapted to function as a switching element. When the gate electrode 60a is formed, a gate bus line is connected to the gate electrode 60a and a gate pad 60b is connected to the end of the gate bus line 60. When the source electrode 70a and the drain electrode 70b are formed, a data bus line 70 connected to the source electrode 70a and a storage capacitance electrode overlapping with some portion of the gate bus line are formed, as shown in FIG. 3a.

Figure 3B:
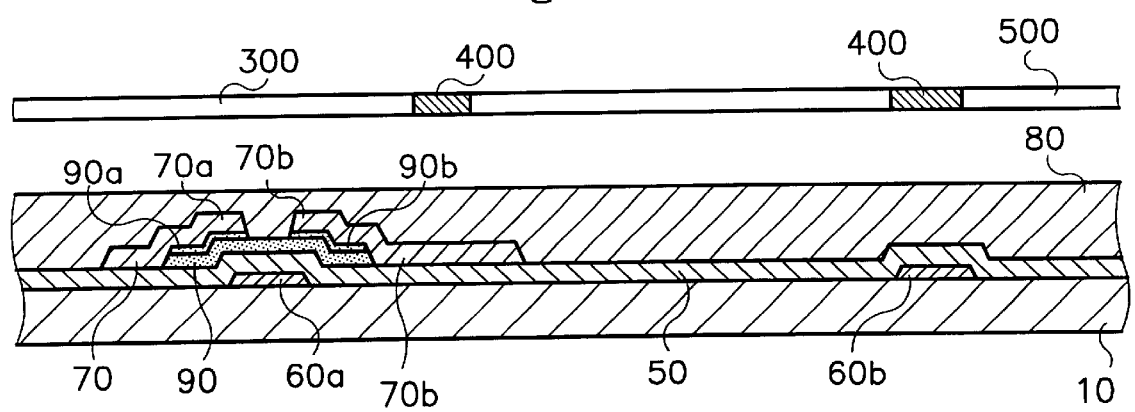

A passivation layer 80 including a photosensitive BCB or a photosensitive acrylic resin is coated and/or deposited on the entire surface of the substrate 10. The passivation layer 80 is exposed after a mask 500 is aligned on the passivation layer 80, as shown in FIG. 3b. If the passivation layer 80 includes a negative photosensitive material, then the reference number 400 is the light blocking portion and the reference number 400 is the light blocking portion and the reference number 300 is the light transparent portion in order to form contact holes exposing the drain electrode 70b, the gate pad 60b and the storage capacitance electrode. If the passivation layer 80 includes a positive photosensitive material, then the reference number 400 is the light transparent portion and the reference number 300 is the light blocking portion.

Figure 3C:
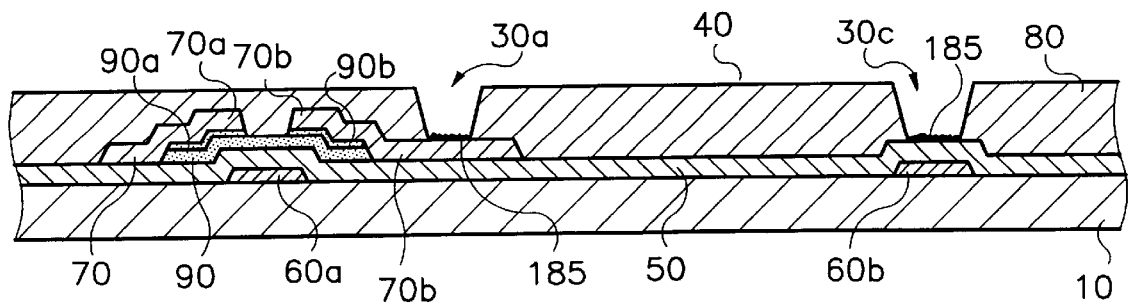

After soft-baking and developing the passivation layer 80, a drain contact hole 30a exposing the drain electrode 70b is formed. A gate contact hole 30c exposing the gate insulation layer 50 covering the gate pad 60b is formed, as shown in FIG. 3c. A storage contact hole exposing the contact holes 30a and 30c, some portion of the passivation material 185 remains so that the drain electrode 70b is not fully exposed and the gate insulating layer 50 still remains.

Figure 3D:
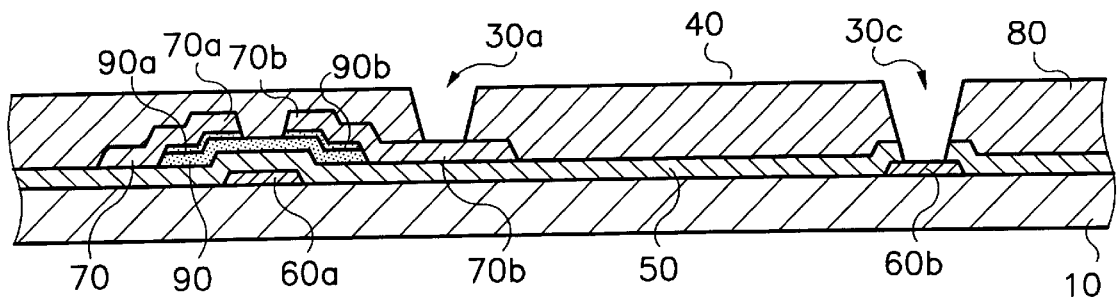

Using an etchant gas such as $CF_4+H_2$, $C_xF_y+H_2$, $C_xF_y+C_xF_yH_z$, $C_xF_y+H_2$, $C_xF_y+H_2$ or $C_xF_yH_z$, the remaining passivation material 185 and the gate insulating layer 50 exposed through the gate contact hole 30c are etched. As a result, the drain contact hole 30a fully exposes the drain electrode 70b and the gate contact hole 30c completely exposes the surface of the gate pad 60b, as shown in FIG. 3d. During this etching step, the drain electrode 70b is not damaged by the etchant and the surface of the passivation layer is smooth and uniform. Furthermore, the gate insulating layer 50 is not undercut and is not over-etched.

In one practical example of preferred embodiments of the present invention, using a flow ratio of about 400/35 sccm of the $CF_4+H_2$ gas, a pressure of about 100 mm Torr and about 1800 W of RF power, the surface of the passivation layer 80 is smooth and the exposed drain electrode and gate pad have the original contact resistivity. In this situation, the etching rate of the gate insulating layer, the drain electrode and the gate pad, and the passivation layer are preferably about 2400/60 sec, 100~120/60 sec and 1000~1200/60 sec, respectively. That is, the etching rate of the drain electrode is less than that of the passivation layer and the etching rate of the passivation layer is less than that of the gate insulating layer.

An additional plasma treatment process of the passivation layer with $H_2$ is preferably performed to enhance the surface state of the passivation layer and the inter-surface characteristics with a layer thereon.

Figure 3E:
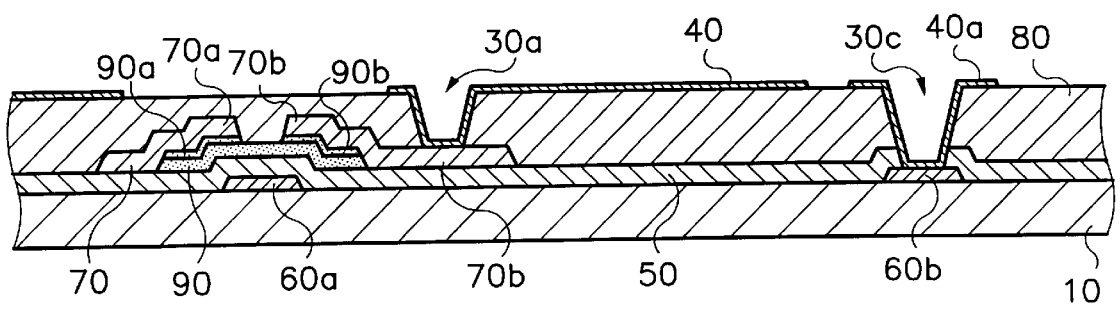

After that, a pixel electrode 40 is formed by depositing and patterning an ITO (Indium Tin Oxide) on the passivation layer 80 including the contact holes 30a and 30c, as shown in FIG. 3e. The pixel electrode 40 is connected to the drain electrode 70b through the drain contact hole 30a. At the same time, a gate terminal 40a is formed while contacting the gate pad 60b through the gate contact hole 30c. Because the pixel electrode 40 is formed on the smooth surface of the passivation layer 80, the shape of the pixel electrode 40 does not have any distorted portion. Furthermore, because the gate contact hole 30c is not over-etched or undercut, the gate terminal is not cut off at the corner of the gate contact hole 30c.

Thus, the present invention provides a method of manufacturing an LCD using a photosensitive material as the passivation layer to simplify the manufacturing process. According to preferred embodiments of the present invention, the photosensitive passivation layer is patterned to form a contact hole using an etching gas which includes at least one of $CF_4+H_2$, $C_xF_y+H_2$, $C_xF_y+C_xF_yH_z$, $C_xF_y+C_xF_yH_z+H_2$ and $C_xF_yH_z$. Therefore, the surface of the patterned passivation layer is reliably smooth and even and there is no remaining portion of the passivation material at the patterned contact hole. Furthermore, the gate insulating layer can be simultaneously patterned to form a gate contact hole exposing some portion of the gate material without any over etched portion or undercut portion of the gate insulating layer and the gate material. So the pixel electrode and/or the gate terminal formed on the smooth surface of the passivation layer have a desired pattern shape and the drain electrode and/or the storage capacitance electrode are not cut off during the formation of the contact holes.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A method for manufacturing a liquid crystal display comprising the steps of:

forming a switching element on a substrate;
       coating an organic passivation layer on the substrate having the switching element using a photosensitive material;
       exposing and developing the passivation layer to form a contact hole exposing at least one electrode of the switching element while causing a remaining portion of the passivation layer to remain in the contact hole;
       etching the passivation layer to remove the remaining portion of the passivation layer in the contact hole with an etching gas which includes at least one selected from the group consisting of $CF_4+H_2$, $C_xF_y+H_2$, $C_xF_y+C_xF_yH_z$, $C_xF_y+H_2$, $C_xF_y+H_2$ and $C_xF_yH_z$; and
       forming a pixel electrode connected to the at least one electrode of the switching element through the contact hole on the passivation layer.

2. The method of claim 1, wherein the step of forming the switching element includes the steps of:

forming a gate electrode and a gate pad on the substrate by depositing and patterning a first metal;
   forming a gate insulating layer on the substrate having the gate electrode and the gate pad;
   forming an island-shaped semiconductor layer on the gate insulating layer over the gate electrode; and
   forming a source electrode and a drain electrode connected to two sides of the semiconductor layer, respectively by depositing and patterning a second metal.

3. The method of claim 2, wherein the step of etching the remaining portion of the passivation material is performed such that some portions of the gate insulating layer covering the gate pad are removed by the etching gas at the same time that the remaining portion of the passivation layer is etched.

4. The method of claim 2, wherein the gate insulating layer includes at least one of an inorganic material and an organic material.

5. The method of claim 2, further comprising the step of forming a storage capacitance electrode so as to overlap with a portion of a gate bus line.

6. The method of claim 5, wherein during the step of exposing and developing the passivation layer, a plurality of contact holes are formed exposing the drain electrode, the gate pad and the storage capacitance electrode.

7. The method of claim 2, wherein in said etching step the remaining portion of the passivation layer is arranged such that the drain electrode is not fully exposed.

8. The method of claim 2, wherein in said etching step the drain electrode is not damaged by the etching gas during the step of etching the passivation layer.

9. The method of claim 2, wherein in said etching step an etching rate of the gate insulating layer is about 2400/60 seconds.

10. The method of claim 2, wherein in said etching step an etching rate of the drain electrode is between about 100/60 seconds and 120/60 second.

11. The method of claim 2, wherein in said etching step an etching rate of the gate pad is between about 1600/60 seconds and 120/60 seconds.

12. The method of claim 1, wherein the passivation layer comprises at least one of photosensitive benzocyclobutene and photosensitive acrylic resin.

13. The method of claim 1, wherein the step of etching the remaining portion of the passivation material includes the step of applying $CF_4+H_2$ gas at a flow rate of about 400/35 sccm, a pressure of about 100 mm Torr and a radio frequency power of about 1800 W.

14. The method of claim 13, further comprising the step of plasma treating the substrate with $H_2$ gas after performing the etching step.

15. The method of claim 1, wherein the passivation layer includes a negative photosensitive material.

16. The method of claim 1, wherein the passivation layer includes a positive photosensitive material.

17. The method of claim 1, wherein in said etching step the remaining portion of the passivation layer is located at a bottom portion of the contact hole.

18. A method for manufacturing a liquid crystal display comprising the steps of:

forming a gate electrode and a gate pad on a substrate;
   forming a gate insulating layer on the substrate having the gate electrode and the gate pad;
   forming a semiconductor layer on the gate insulating layer over the gate electrode;
   forming a source electrode and a drain electrode connected to the semiconductor layer;
   coating an organic passivation layer on the substrate using a photosensitive material;
   exposing and developing the passivation layer to form at least one contact hole exposing at least one of the gate electrode, the drain electrode and the source electrode while causing a remaining portion of the passivation layer to remain in the at least one contact hole; and
   etching the passivation layer to remove the remaining portion of the passivation layer from the at least one contact hole while simultaneously etching some portions of the gate insulating layer covering the gate pad.

19. The method of claim 18, wherein the step of etching includes applying an etching gas from the group consisting of $CF_4+H_2$, $C_xF_y+H_2$, $C_xF_y+C_xF_yH_z$, $C_xF_y+H_2$, $C_xF_y+H_2$ and $C_xF_yH_z$.

20. The method of claim 19, wherein the drain electrode is not damaged by the etching gas during the step of etching the passivation layer.

* * * * *